United States Patent
Joshi et al.

(10) Patent No.: US 7,606,176 B2
(45) Date of Patent: Oct. 20, 2009

(54) SYSTEM AND METHOD TO IMPROVE THE PERFORMANCE OF AN ON DEMAND ROUTING PROTOCOL IN A WIRELESS NETWORK

(75) Inventors: Avinash Joshi, Orlando, FL (US); William Vann Hasty, Jr., Lake Forest, FL (US); Surong Zeng, Altamonte Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 713 days.

(21) Appl. No.: 11/158,522

(22) Filed: Jun. 22, 2005

(65) Prior Publication Data

US 2005/0286419 A1    Dec. 29, 2005

Related U.S. Application Data

(60) Provisional application No. 60/582,750, filed on Jun. 24, 2004.

(51) Int. Cl.
     *H04L 12/28*    (2006.01)
(52) U.S. Cl. .................. 370/255; 370/238; 370/252; 370/254; 370/395.21; 370/328
(58) Field of Classification Search ............ 370/229, 370/235, 252, 254, 255, 328, 329, 338, 345, 370/347, 348, 351, 445, 447, 458, 461, 462, 370/465, 468, 238, 395.21
See application file for complete search history.

(56) References Cited

U.S. PATENT DOCUMENTS

| | | | |
|---|---|---|---|
| 5,943,322 A | 8/1999 | Mayor | |
| 6,456,599 B1 * | 9/2002 | Elliott | ............... 370/254 |
| 6,487,172 B1 | 11/2002 | Zonoun | |
| 6,807,165 B2 | 10/2004 | Belcea | |
| 6,873,839 B2 | 3/2005 | Stanforth | |
| 7,266,085 B2 * | 9/2007 | Stine | ............... 370/252 |
| 7,269,155 B2 * | 9/2007 | Joshi | ............... 370/338 |
| 7,280,483 B2 * | 10/2007 | Joshi | ............... 370/238 |
| 7,299,038 B2 * | 11/2007 | Kennedy et al. | ......... 455/422.1 |
| 7,330,694 B2 * | 2/2008 | Lee et al. | ............... 455/7 |
| 7,339,897 B2 * | 3/2008 | Larsson et al. | ............ 370/252 |
| 7,382,765 B2 * | 6/2008 | Kennedy et al. | ............ 370/351 |
| 7,401,217 B2 * | 7/2008 | Huang et al. | ............... 713/153 |
| 7,450,521 B2 * | 11/2008 | Park et al. | ............... 370/252 |
| 7,480,248 B2 * | 1/2009 | Duggi et al. | ............... 370/238 |
| 2002/0049561 A1 | 4/2002 | Garcia-Luna-Aceves et al. | |
| 2002/0058502 A1 | 5/2002 | Stanforth | |

(Continued)

OTHER PUBLICATIONS

C.E. Perkins, et al., "Ad Hoc On Demand Distance Vector (AODV) Routing," IETF Experimental RFC, Jul. 2003.

(Continued)

*Primary Examiner*—Michael J Moore, Jr.
*Assistant Examiner*—Mark A Mais
(74) *Attorney, Agent, or Firm*—Randi L. Karpinia; Joseph J. Buczynski

(57) ABSTRACT

A system and method for improving the performance of an on-demand routing protocol in a wireless network is provided. The invention provides improved system performance of a wireless network by enabling nodes following an on-demand routing protocol to process (and possibly reply to) route request messages multiple times based on the routing metrics.

20 Claims, 3 Drawing Sheets

U.S. PATENT DOCUMENTS

| | | |
|---|---|---|
| 2002/0191573 A1 | 12/2002 | Whitehill |
| 2003/0202468 A1 | 10/2003 | Cain et al. |
| 2003/0204616 A1 | 10/2003 | Billhartz et al. |
| 2004/0143842 A1 | 7/2004 | Joshi |
| 2004/0246935 A1 | 12/2004 | Joshi |
| 2004/0252643 A1 | 12/2004 | Joshi |
| 2004/0260808 A1 | 12/2004 | Strutt |
| 2004/0264372 A1* | 12/2004 | Huang ................... 370/230 |
| 2005/0041591 A1 | 2/2005 | Duggi et al. |
| 2005/0054346 A1* | 3/2005 | Windham et al. ........... 455/445 |

OTHER PUBLICATIONS

D.B. Johnson, et al., "The Dynamic Source Routing Protocol for Mobile Ad Hoc Networks (DSR)," IETF Internet draft, draft-ietf-manet-dsr-09.tst, Apr. 2003 (Work in Progress).

PCT International Search Report Application No. PCT/US05/22238 Dated May 19, 2006-10 Pages.

* cited by examiner

SYSTEM AND METHOD TO IMPROVE THE PERFORMANCE OF AN ON DEMAND ROUTING PROTOCOL IN A WIRELESS NETWORK

This application claims the benefit of U.S. Provisional Application No. 60/582,750, filed Jun. 24, 2004, the entire content being incorporated herein by reference.

BACKGROUND OF THE INVENTION

1. Field of the Invention

The present invention relates to a system and method for improving the performance of an on-demand routing protocol in a wireless network.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, now U.S. Pat. No. 7,072,650; in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, now U.S. Pat. No. 6,807,165; and in U.S. patent application Ser. No. 09/815,164 entitled "Prioritized-Routing for an Ad-Hoc, Peer-to-Peer, Mobile Radio Access System", filed on Mar. 22, 2001, now U.S. Pat. No. 6,873,839, the entire content of each being incorporated herein by reference. Internet Engineering Task Force (IETF) has charted a working group called Mobile Ad Hoc Networks (MANET) to standardize IP routing protocol functionality suitable for wireless routing application within both static and dynamic topologies with increased dynamics due to node motion or other factors. Two of the On-Demand (or Reactive) routing protocols considered by the group are the Ad hoc On-Demand Distance Vector (AODV) (RFC 3561) Routing Protocol and the Dynamic Source Routing (DSR) (currently an internet draft) protocol.

On-demand routing protocols create routes only when desired by the source node. When a node requires a route to a destination, it initiates a route discovery process within the network. This process is completed once a route is found or all possible route permutations have been examined. Once a route has been established, it is maintained by some form of route maintenance procedure until either the destination becomes inaccessible along every path from the source or until the route is no longer desired.

Typically the Route Discovery involves broadcasting and forwarding of Route Request (RREQ) packets until the route is found. These Route Request packets typically contain the IP address of the node originating the Route Request and a number called the Route Request ID (or RREQ ID). Each node maintains only one RREQ ID, which is incremented by one from the last RREQ ID used by the node before initiating the new RREQ packet. The RREQ ID uniquely identifies the particular RREQ when taken in conjunction with the source node's IP address. In other words, the tuple, <source node's IP address, RREQ ID>, uniquely identifies a particular RREQ in the network. When a node receives this RREQ, it checks to determine whether it has received a RREQ with the same Originator IP Address and RREQ ID within some last period of time. If such a RREQ has been received, the node silently discards the newly received RREQ. In this way, when the node receives the packet again from its neighbors, it will not reprocess and re-forward the packet.

This scheme was originally developed to reduce the overhead and processing time associated with the RREQ packet if it is reprocessed and is suitable if the routing metric used is the number of hops in this desired route. However, this scheme can lead to un-optimal routes if the protocol uses some other metric (such as link quality, delay, or throughput), as demonstrated in the Detailed Description below where a possible better route is not selected because each of the nodes discard a rebroadcasted route request if it already has seen the same tuple. The optimal route can thus never be found with the rules specified in the AODV protocol draft, especially when small routing messages can successfully be transmitted over bad links.

Accordingly, a need exists to locate and identify optimal network routes, to thus improve overall performance of a network, including improvement of throughput, delay, and packet completion rate. The present invention provides improved system performance of a wireless network by enabling nodes following an on-demand routing protocol to process (and possibly reply to) route request messages multiple times based on the routing metrics.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
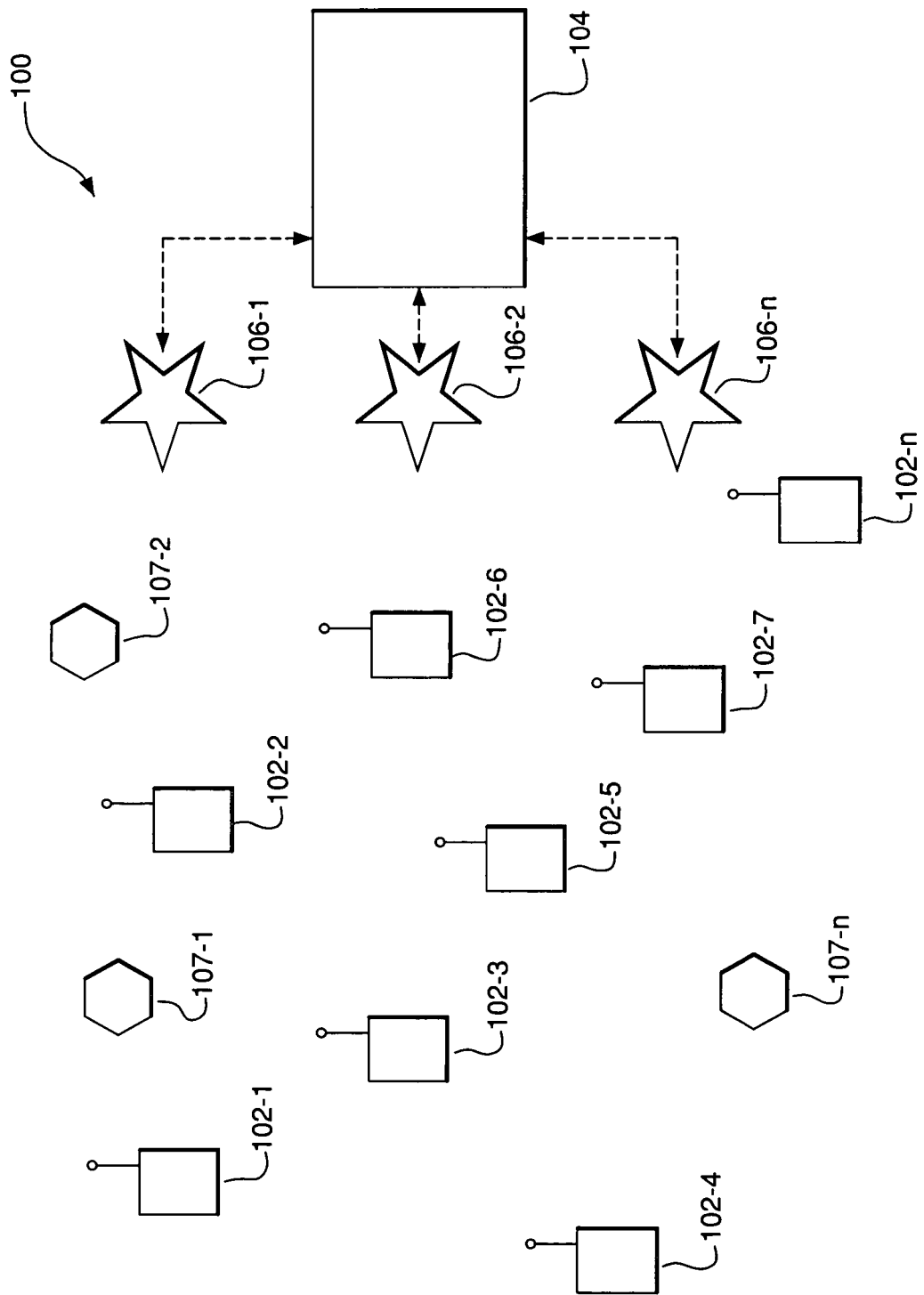
FIG. 1 is a block diagram of an example ad-hoc wireless communications network including a plurality of nodes employing a system and method in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, ... 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 5,943,322, 7,072,650, 6,807,165 and 6,873,839, referenced above.

Figure 2:
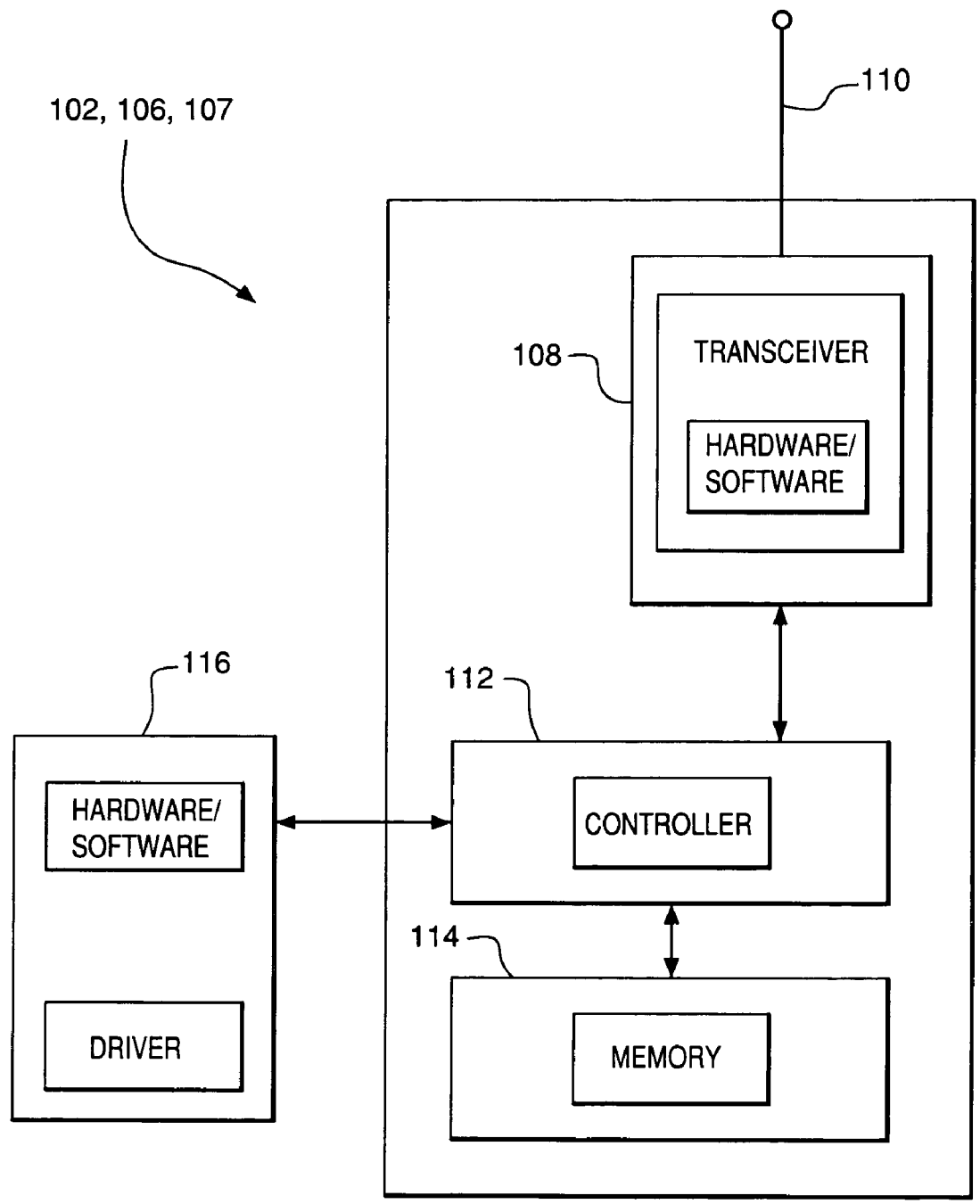
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As will now be discussed in detail, the present invention provides a system and method to locate and identify optimal network routes, to thus improve overall performance of a network, including improvement of throughput, delay, and packet completion rate. The present invention further provides improved system performance of a wireless network by enabling nodes following an on-demand routing protocol to process (and possibly reply to) route request messages multiple times based on the routing metrics.

Figure 3:
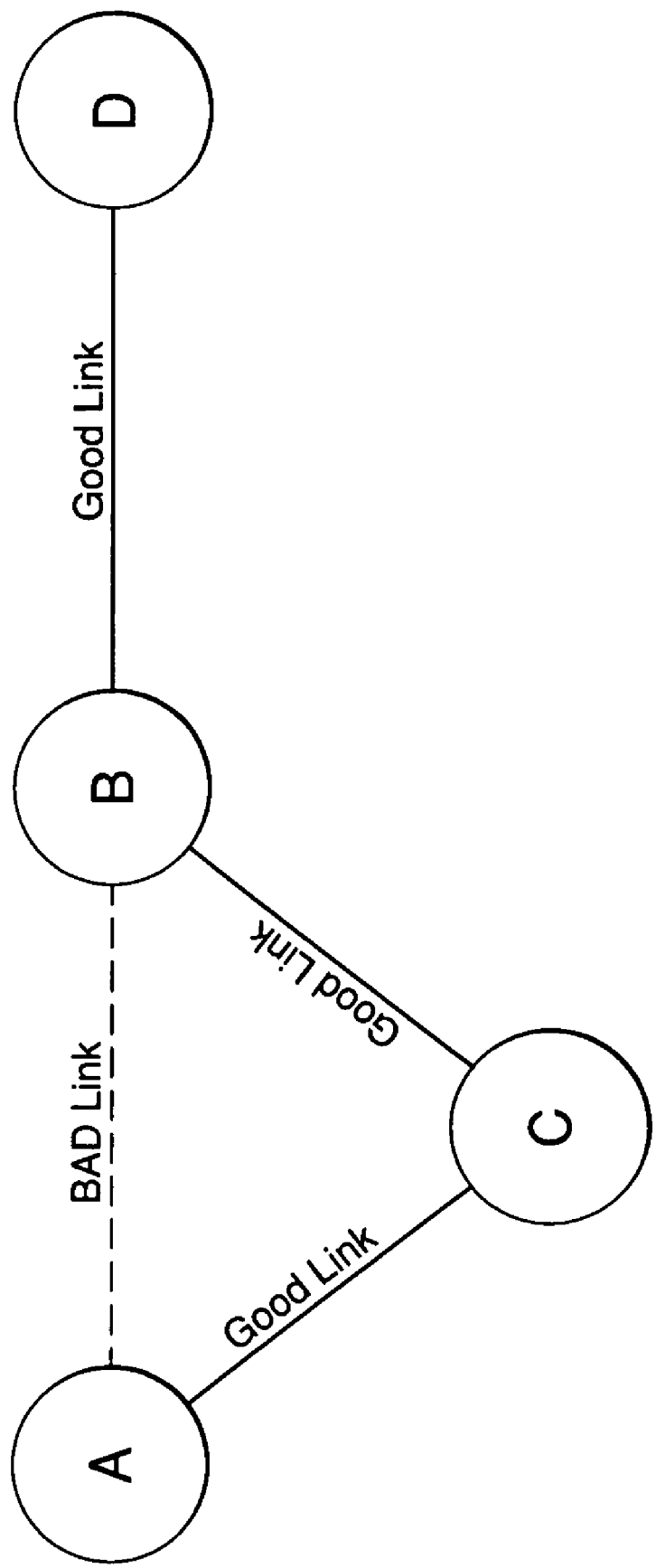
FIG. 3 is a block diagram illustrating an example of a network of mobile nodes with wireless links.

FIG. 3 illustrates a simple network through which the advantages of the current invention will be described. For the purpose of simplicity, it can be assumed that the circles in FIG. 3 are mobile nodes following changes recommended in this invention to the standard AODV routing protocol and the lines connecting the circles represent the wireless links. It is also assumed that initially no node has a route for other nodes. It is also assumed that the wireless link between nodes A and B is bad and hence offers lower throughput and higher delay compared to a good link. The link between A and B is so bad that it is preferable to use node C for communication between A and B, as well as A and D or in other words routing metrics of the link A-D is worse than cumulative routing metrics of route A-C-B. It should be noted here that due to the characteristics of wireless links, small packets like RREQ and RREP can still be successfully delivered over bad links while relatively large packets fail.

The current invention improves the system performance of a wireless network by enabling the nodes following an on-demand routing protocol to use the routing metrics in place of just hops in routing messages. Thus, for example, a node will update a route if it receives a Route Request (RREQ) or Route Reply (RREP) packet with better metrics even if the sequence number is same as stored in the routing table. It further improves the performance by enabling the nodes following an on-demand routing protocol to process (and possibly reply to) route request messages multiple times based on the routing metrics. In the current invention, instead of silently discarding a RREQ with a duplicate tuple <IP Address, RREQ ID>, the new RREQ is accepted if the routing metrics carried in the new RREQ are lower than what was carried in the previous RREQ. The metrics can simply be hops as in the standard protocols AODV, DSR, etc., or can be a combination of link quality, data rate, congestion, battery power, types of device, etc., as in published U.S. Patent Application Publication No. 2002/0191573 entitled "Embedded Routing Algorithms Under the Internet Protocol Routing Layer of a Software Architecture Protocol Stack in a Mobile Ad-Hoc Network"; U.S. Patent Application Publication No. US20040246935A1 entitled "System and Method for Characterizing the Quality of a Link in a Wireless Network"; U.S. Pat. No. 7,280,483 entitled "System and Method to Improve the Network Performance of a Wireless Communication Network by Finding an Optimal Route Between a Source and a Destination" granted Oct. 09, 2007; U.S. Patent Application Publication No. US20040143842A1 entitled "System and Method for Achieving Continuous Connectivity to an Access Point or Gateway in a Wireless Network Following an On-Demand Routing Protocol, and to Perform Smooth Handoff of Mobile Terminals Between Fixed Terminals in the Network"; and U.S. Pat. No. 7,412,241 entitled "A System and Method for Providing a Measure of Link Reliability to a Routing Protocol in an Ad Hoc Wireless Network", granted Aug. 12, 2008, the entire contents of each being incorporated herein by reference. The metrics are carried in the RREQ packet as explained in the above mentioned patent applications.

Hence, in the current invention, the first RREQ with tuple <Source IP address, RREQ ID> is always processed as specified in the standard protocols (AODV, DSR) but the subsequent ones (i.e. the one which are received with the same tuple <Source IP address, RREQ ID> are also processed if the metrics carried in the RREQ is less than what was carried in the previous RREQ. To do this the nodes should also store the Routing Metrics while storing the tuple <Source IP address, RREQ ID>.

Once the RREQ is accepted for processing, normal rules specified by standards should be used to decide if the RREQ needs to be forwarded or replied depending upon the factors specified in the standards.

The following events will happen if node A in the network shown in FIG. 3 wants to find a route to node D and all the nodes in the network follow the changes recommended in this invention to the standard AODV.

1. Node A issues the RREQ with its current RREQ ID, x (for example), its IP address, and TTL=1, i.e. the RREQ will have tuple <A, x>.
2. Nodes B and C being neighbors of node A will receive this RREQ packet.
3. Nodes B and C will check if a RREQ with tuple <A,x> was received before. Finding none, this RREQ will be processed. As per the assumption, nodes B and C do not have a route to node D and hence no RREP can be generated by these nodes. And since the TTL in RREQ was 1, nodes B and C cannot even forward the RREQ.
4. On receiving no response for the RREQ, node A will time out and will reissue the RREQ with new RREQ ID=x+1, its IP address, and TTL=2, (it is assumed here that the nodes follow an expanding search technique). The RREQ will have tuple <A, x+1>.
5. Nodes B and C will receive the RREQ again and will process it, as the RREQ with tuple <A, x+1> has not been received before.
6. Since nodes B and C still do not have a route to node D, no reply will be generated. But since the TTL in RREQ was 2 they can rebroadcast the packet after decrementing the TTL and incrementing the hop count.
7. Nodes B and C rebroadcast the RREQ with RREQ ID=x+1, A's IP address, and TTL=1, i.e. with <A, x+1>.
8. RREQ rebroadcasted from node B is received by nodes A, C, and D. Node A discards the RREQ as it is the originator of it. Node C does not disregard the message merely because it has already seen the same tuple <A, x+1> before. Rather, node C will compare the routing metrics carried in the new RREQ with the metrics in the one it has stored (the one that came directly from A). As per the assumption regarding the routing metrics between nodes, node C will disregard the message because the corresponding entry in the routing table carries lower routing metrics than the new RREQ.
9. Node D processes the RREQ from node B and generates a Route Reply establishing a route A-B-D.
10. RREQ rebroadcasted from node C (from step 7) is received by nodes A and B. Node A discards the RREQ as it is the originator of it. But node B will compare the routing metrics carried in the new RREQ with the metrics in the one it has stored (the one that came directly from A). As per the assumption regarding the routing metrics between nodes, node B will find that the new RREQ carries lower routing metric compared to the previous one and hence will choose to process it. Processing the RREQ at this stage will mean that node B will update the route table entry pertaining to node A and hence will have a route B-C-A for node A in place of the previous direct route to node A. In doing so, node B will also update the routing metric stored at the corresponding entry in the routing table in accordance with this routing metric carried in the RREQ being processed. Because, at this time, Node B already has a route to D, Node B will simply send a Route Reply to Node A through Node C. Node B may also send a gratuitous reply to node D if the corresponding flag ("G" flag) is set as specified in AODV.
11. Eventually the route A-C-B-D will be formed.

As shown in this example, the technique according to the present invention determines an optimal route. If the known AODV technique were used in this example, node B would have dropped the RREQ received in step 10 without even looking into the metrics and would have continued to use the direct bad route to A.

The above method has been described with IP addresses as AODV and DSR are currently specified on layer 3. But if routing is done on Layer 2, IP addresses can simply be replaced by MAC addresses and the same scheme will work.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of optimizing a communication route within a wireless network operating using an on demand routing protocol, the method comprising:
    receiving a route request at a node, wherein the route request comprises at least one routing metric;
    determining if the route request is a duplicate route request by identifying a corresponding entry in a routing table of the node;
    when the route request is a duplicate route request, comparing the routing metric of the currently received route request to a stored routing metric stored in the corresponding entry in the routing table; and
    updating the communication route when the received routing metric is better than the stored routing metric; and
    discarding the currently received route request when the stored routing metric is better than the received routing metric.

2. The method of claim 1, wherein the route request further comprises an address and a route request identifier.

3. The method of claim 2, wherein the address relates to a node that first generated the route request.

4. The method of claim 1, further comprising:
    accepting the route request at the node if the routing metric carried in the route request has a value lower than that of the routing metric stored in a corresponding entry of the routing table at the node, and updating the corresponding entry of the routing table.

5. The method of claim 2, wherein the address is an IP address.

6. The method of claim 2, wherein the address is a MAC address.

7. The method of claim 1, further comprising prior to the comparing step:
    analyzing the received routing metric.

8. The method of claim 1, wherein the routing metric comprises information indicating a number of hops in the communication route.

9. The method of claim 1, wherein the routing metric comprises information pertaining to link quality along the communication route.

10. The method of claim 1, wherein the routing metric comprises information pertaining to data rate along the communication route.

11. The method of claim 1, wherein the routing metric comprises information pertaining to congestion along the communication route.

12. The method of claim 1, wherein the routing metric comprises information pertaining to battery power of nodes along the communication route.

13. The method of claim 1, wherein the routing metric comprise information pertaining to types of devices along the communication route.

14. An ad-hoc packet-switched wireless communication network comprising:
   a plurality of mobile wireless nodes,
      wherein at least one node is capable of transmitting and receiving route requests that each comprise respective address information, a respective route request identifier, and at least one respective routing metric; and
      wherein at least one node receives a duplicate route request that has the same address and same route request identifier as a previously received route request, and updates a communication route if the duplicate route request carries a routing metric having a condition more desirable than a condition of the routing metric currently stored in a corresponding entry in the routing table.

15. The network of claim 14, wherein the address is an IP address.

16. The network of claim 14, wherein the address is a MAC address.

17. The network of claim 14, wherein the at least one node will update the communication route using the duplicate route request if a value of the routing metric carried in the route request is lower than that of the routing metric stored in a corresponding entry of the routing table at the node, and update the corresponding entry of the routing table.

18. A node, operating in a wireless network in accordance with an on-demand routing protocol, the node comprising:
   a transceiver, for receiving a route request comprising at least one routing metric; and
   a controller, for:
      determining if the route request is a duplicate route request by identifying a corresponding entry in a routing table of the node;
   when the route request is a duplicate route request, comparing the routing metric of the currently received route request to a route metric of a previously received route request,
   updating the communication route when the received routing metric is better than the stored routing metric; and
   discarding the currently received route request when the stored routing metric is better than the received routing metric.

19. The node of claim 18, wherein:
   the controller updates the corresponding entry of the routing table.

20. The node of claim 18, wherein:
   the route request farther comprises an address and a route request identifier; and
   the routing metric comprises information indicating at least one of the following:
a number of hops in a desired route; information pertaining to link quality along a desired route; information pertaining to data rate along a desired route; information pertaining to congestion along a desired route; information pertaining to battery power of nodes along a desired route; and information pertaining to types of devices along a desired route.

* * * * *

UNITED STATES PATENT AND TRADEMARK OFFICE
CERTIFICATE OF CORRECTION

PATENT NO. : 7,606,176 B2  Page 1 of 1
APPLICATION NO. : 11/158522
DATED : October 20, 2009
INVENTOR(S) : Joshi et al.

It is certified that error appears in the above-identified patent and that said Letters Patent is hereby corrected as shown below:

In Column 8, Line 22, in Claim 20, delete "farther" and insert -- further --, therefor.

Signed and Sealed this

Fifth Day of October, 2010

David J. Kappos
*Director of the United States Patent and Trademark Office*